(12) United States Patent
Wang et al.

(10) Patent No.: US 8,320,358 B2
(45) Date of Patent: Nov. 27, 2012

(54) METHOD AND APPARATUS FOR RESOLVING BLINDED-NODE PROBLEMS IN WIRELESS NETWORKS

(75) Inventors: Xiaofei Wang, Somerville, MA (US); Saishankar Nandagopalan, San Diego, CA (US); Santosh Abraham, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 11/955,257

(22) Filed: Dec. 12, 2007

(65) Prior Publication Data

US 2009/0154372 A1 Jun. 18, 2009

(51) Int. Cl.
*H04J 3/24* (2006.01)
*H04L 12/56* (2006.01)

(52) U.S. Cl. ........................................ 370/349; 370/392
(58) Field of Classification Search .................. None
See application file for complete search history.

(56) References Cited

U.S. PATENT DOCUMENTS

| | | | | |
|---|---|---|---|---|
| 5,592,483 A * | 1/1997 | Hieda et al. | ................... | 370/445 |
| 5,953,330 A * | 9/1999 | Canniff et al. | ................. | 370/352 |
| 6,977,944 B2 * | 12/2005 | Brockmann et al. | .......... | 370/461 |
| 7,046,690 B2 * | 5/2006 | Sherman | ........................ | 370/445 |
| 7,050,436 B1 * | 5/2006 | Gurney | ............................ | 370/394 |
| 7,133,381 B2 * | 11/2006 | Sherman | ........................ | 370/329 |
| 7,231,530 B1 * | 6/2007 | Miller et al. | ................... | 713/320 |
| 7,257,095 B2 | 8/2007 | Liu | | |
| 7,408,909 B2 * | 8/2008 | Trainin et al. | ................. | 370/338 |
| 7,415,624 B2 * | 8/2008 | Miller et al. | ................... | 713/320 |
| 7,447,185 B2 * | 11/2008 | Trainin | ......................... | 370/338 |
| 7,522,552 B2 * | 4/2009 | Fein et al. | ...................... | 370/328 |
| 7,522,576 B2 * | 4/2009 | Du et al. | ........................ | 370/349 |
| 7,561,525 B2 * | 7/2009 | Saito | ............................. | 370/237 |
| 7,567,526 B2 * | 7/2009 | Ji | ............................... | 370/310.2 |
| 7,570,656 B2 * | 8/2009 | Raphaeli et al. | ............... | 370/445 |
| 7,616,655 B2 * | 11/2009 | Benveniste | .................... | 370/447 |
| 7,620,054 B2 * | 11/2009 | Katayama | ................ | 370/395.42 |
| 7,623,481 B2 * | 11/2009 | Chen | ............................. | 370/322 |
| 7,653,043 B2 * | 1/2010 | Sakoda | ......................... | 370/349 |
| 7,664,132 B2 * | 2/2010 | Benveniste | .................... | 370/445 |
| 7,792,092 B1 * | 9/2010 | Olkkonen et al. | ............. | 370/352 |
| 2002/0141439 A1 * | 10/2002 | Bardini | .......................... | 370/465 |

(Continued)

FOREIGN PATENT DOCUMENTS

CN 1685743 A 10/2005

(Continued)

OTHER PUBLICATIONS

Ping Chung Ng et al.: "Throughput Analysis of IEEE802.11 Multi-Hop Ad Hoc Networks" IEEE/ACM Transactions on Networking, vol.15, No. 2, Apr. 1, 2007, pp. 309-322, XP011176768, Apr. 2007.

(Continued)

*Primary Examiner* — Gregory Sefcheck
(74) *Attorney, Agent, or Firm* — Dang M. Vo

(57) ABSTRACT

Techniques for resolving blinded-node problems are described herein. One aspect operates on the physical (PHY) layer only, which a second layer operates on the medium access control (MAC) layer. Both aspects involve having a node stop processing a data packet that is not destined for it so as to be able to reserve its resources to detect control and other packets. An apparatus for implementing the techniques are also disclosed.

25 Claims, 7 Drawing Sheets

U.S. PATENT DOCUMENTS

| | | | |
|---|---|---|---|
| 2002/0181492 A1* | 12/2002 | Kasami et al. | 370/445 |
| 2004/0047319 A1* | 3/2004 | Elg | 370/338 |
| 2005/0002355 A1 | 1/2005 | Takano | |
| 2005/0002364 A1* | 1/2005 | Ozer et al. | 370/338 |
| 2005/0089005 A1* | 4/2005 | Sakoda et al. | 370/348 |
| 2005/0141545 A1* | 6/2005 | Fein et al. | 370/445 |
| 2005/0153735 A1* | 7/2005 | Morioka et al. | 455/553.1 |
| 2005/0254513 A1* | 11/2005 | Cave et al. | 370/445 |
| 2006/0072563 A1* | 4/2006 | Regnier et al. | 370/389 |
| 2006/0114851 A1* | 6/2006 | Gupta et al. | 370/329 |
| 2006/0187964 A1 | 8/2006 | Li et al. | |
| 2006/0209772 A1* | 9/2006 | Fang et al. | 370/338 |
| 2006/0268924 A1* | 11/2006 | Marinier et al. | 370/445 |
| 2007/0025288 A1 | 2/2007 | Nagai et al. | |
| 2007/0076742 A1* | 4/2007 | Du et al. | 370/445 |
| 2007/0195812 A1* | 8/2007 | Lee | 370/445 |
| 2007/0217443 A1* | 9/2007 | Sakoda et al. | 370/463 |
| 2008/0114842 A1* | 5/2008 | Ellis et al. | 709/206 |
| 2009/0016280 A1* | 1/2009 | Iyer et al. | 370/329 |

FOREIGN PATENT DOCUMENTS

| | | |
|---|---|---|
| JP | 2004040373 | 2/2004 |
| JP | 2005184423 A | 7/2005 |
| RU | 2281617 C2 | 8/2006 |
| TW | 200420051 | 10/2004 |
| TW | M291146 | 5/2006 |
| TW | M307261 | 3/2007 |
| WO | WO03028315 A1 | 4/2003 |
| WO | WO03049405 A1 | 6/2003 |
| WO | WO2004102888 A1 | 11/2004 |
| WO | WO2005067214 A1 | 7/2005 |
| WO | WO2007038118 A2 | 4/2007 |

OTHER PUBLICATIONS

International Search Report—PCT/US2008/052820, International Search Authority—European Patent Office—Oct. 6, 2008.

Written Opinion—PCT/US2008/052820, International Search Authority—European Patent Office—Oct. 6, 2008.

The IEEE 802.11 WLAN Working Group: http://grouper.ieee.org/groups/802/11/, Oct. 27, 2008.

Taiwan Search Report—TW097104710—TIPO—Jun. 14, 2011.

* cited by examiner

METHOD AND APPARATUS FOR RESOLVING BLINDED-NODE PROBLEMS IN WIRELESS NETWORKS

BACKGROUND

1. Field

The present disclosed aspects relates generally to wireless network protocols, and more specifically to method and apparatus for resolving blinded-node problems in wireless networks.

2. Background

The Institute of Electrical and Electronics Engineers, Inc. (IEEE) 802.11 Wireless Local Area Network (WLAN) Standards have gained significant popularity in recent years. This family of standards covers a wide range of wireless networks with various system designs that are meant to handle a different traffic and user scenarios. Many other wireless networks designs, such as residential and commercial wireless networks, mesh networks, ad hoc networks, wireless sensor networks, etc., are based on the IEEE 802.11 standards.

In IEEE 802.11-based wireless networks, control messages such as request to send (RTS)/clear to send (CTS) are used by the various nodes of the network to reserve access to the wireless medium. The RTS/CTS mechanism is used to minimize or eliminate interference and collisions between the nodes of the network that wish to communicate over the medium. However, one scenario in which medium reservation using RTS/CTS exchanges breaks down occurs when one or more nodes are not able to detect the RTS/CTS exchanges because the node is listening to the wrong RTS/CTS exchange. This scenario is referred to as the "blinded node problem," in line with such widely accepted terms as the hidden node problem and the exposed node problem. This problem can take place in all communications systems in which the RTS/CTS control packets are used to reserve the medium. The blinded node problem can cause degradation of both the throughput and delay performance of the wireless network, both locally and network-wide.

There is therefore a need in the art for a solution to resolve the blinded node problem that occurs in wireless networks that rely on the RTS/CTS wireless medium reservation mechanism.

SUMMARY

Aspects disclosed herein address the blinded-node problem by a node stopping the processing of a data packet that is not destined for it so as to be able to reserve its resources to detect control and other packets that are destined for it.

In an aspect, a method of wireless communication is implemented as receiving a packet comprising at least one header and non-header information; and decoding the at least one header to determine whether the non-header information should be processed.

In another aspect, a computer-program product for wireless communication is implemented as having computer-readable medium including codes executable by at least one computer to receive a packet comprising at least one header and non-header information; and decode the at least one header to determine whether the non-header information should be processed.

In yet another aspect, an apparatus for wireless communications is implemented as having means for receiving a packet comprising at least one header and non-header information; and means for decoding the at least one header to determine whether the non-header information should be processed.

In yet another aspect, an apparatus for wireless communications is implemented as having a receiver configured to receive a packet including at least one header and non-header information; and a decoder configured to decode the at least one header to determine whether the non-header information should be processed.

In yet another aspect, an access point is implemented as having an antenna; a receiver adapted to receive, via the antenna, a packet comprising at least one header and non-header information; and a decoder coupled to the receiver, the decoder configured to decode the at least one header to determine whether the non-header information should be processed.

In yet another aspect, an access terminal is implemented as having a receiver adapted to receive a packet comprising at least one header and non-header information. The access terminal also includes a decoder coupled to the receiver, the decoder configured to decode the at least one header to determine whether the non-header information should be processed; and a user interface adapted to provide an indication based on the non-header information.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Further, also the description utilizes a network that involves the IEEE 802.11 standard, networks that utilize other protocols may benefit from the various techniques and systems disclosed herein.

Figure 1:
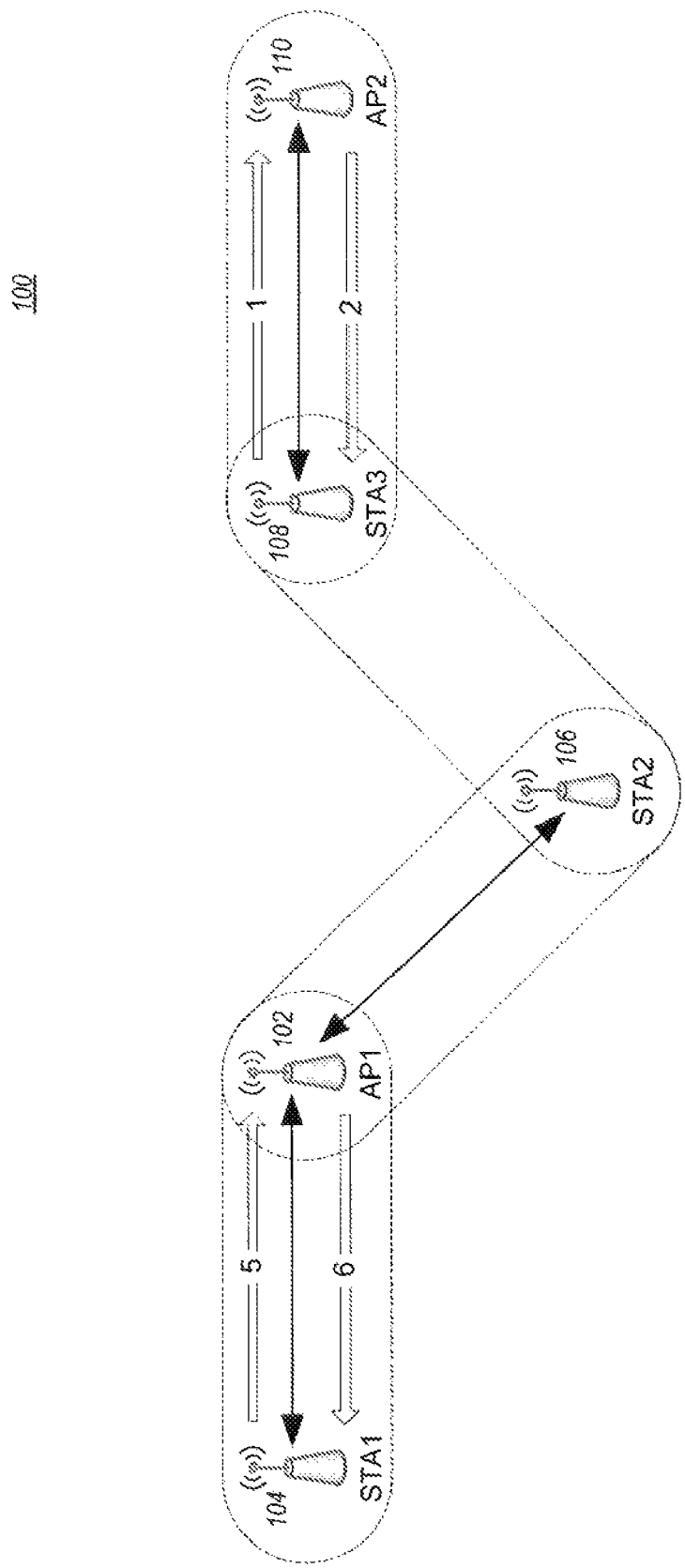
FIG. 1 is a network diagram used to describe the blinded node problem.

A communication problem referred to herein as a "blinded node" problem may be illustrated using a simple five-node network 100 as shown in FIG. 1, where a station STA1 104 and an access point AP1 102 are within range of each other, where being "in range" means that that two transceivers (e.g., station STA1 104 and access point AP1 102) are able to communicate with each other. Similarly, as illustrated in FIG. 1, a station STA3 108 and an access point AP2 110 are within range of each other. In addition, a station STA2 106 is within range of both AP1 102 and station STA3 108. However, station STA1 104 and station STA2 106 are associated with access point AP1 102, and station STA3 108 is associated with access point AP2 110. Further, access point AP1 102 and station STA3 108 are not in range of each other, and station STA1 104 and station STA2 106 are not in range of each other.

The blinded node problem arises where communication between station STA1 104 and access point AP1 102 can be significantly hindered by station STA2 106 during operation of the nodes in accordance with the IEEE 802.11 protocol. The blinded node problem is described with reference back to FIG. 1, where station STA2 106 is blinded by a data packet sent out by station STA3 108 to access point AP2 110. While station STA2 106 has locked onto and is receiving this data packet, it misses the CTS message sent out by access point AP1 102. Because station STA2 106 is not aware of the transmission of the data packet by station STA1 104 to access point AP1 102, when station STA2 106 wants to transmit information to access point AP1 102, station STA2 106 will send out an RTS message to access point AP1 102, interfering with and potentially destroying the data packet that access point AP1 102 is receiving from station STA1 104.

Figure 2:
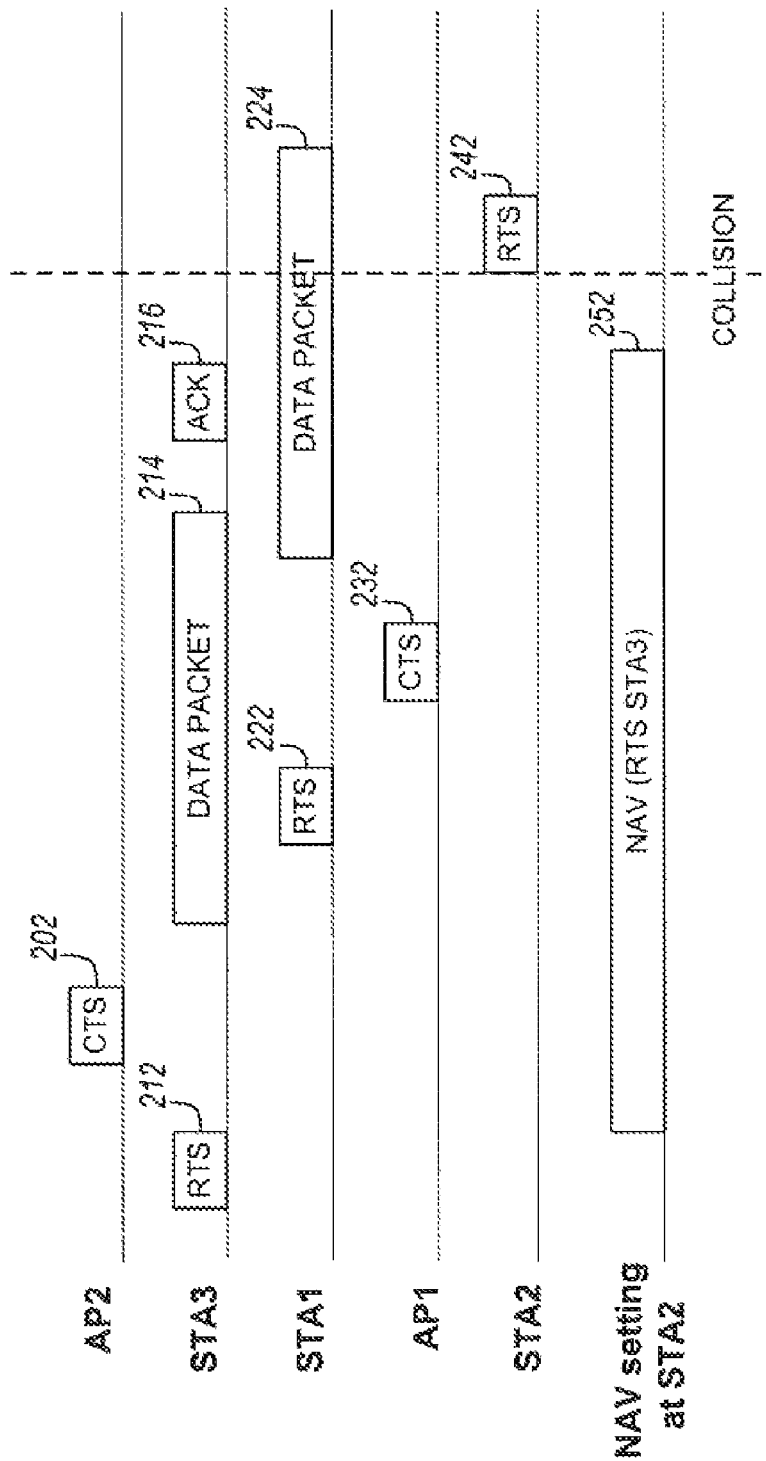
FIG. 2 is a timing diagram used to describe the blinded node problem.

A detailed explanation follows, with additional reference to a timing diagram 200 as shown in FIG. 2, where station STA3 108 engages in a process of transmitting a long frame to access point AP2 110. Station STA3 108 will transmit an RTS message 212 and receive a CTS message 202 from AP2 110 before station STA3 108 begins to transmit a data packet 214. Because station STA2 106 is within range of station STA3 108, it will detect the preamble from station STA3 108 and continue to accumulate the bits of the packet from station STA3 108 as prescribed by the operation of the protocol. The data packet 214 will be discarded by station STA2 106 when it is decoded and the destination address contained therein does not match station STA2 106. However, during that time period, station STA2 106 would have set its NAV 252 based on the RTS message 212. When station STA1 104 sends an RTS message 222 to access point AP1 102, access point AP1 102 would respond with a CTS message 232 because it is not affected by the communication between station STA3 108 and access point AP2 110, and station STA1 104 would begin sending a data packet 224 to access point AP1 102. The CTS message 232 from access point AP1 102 will not be detected by station STA2 106 because STA2 106 is locked onto the data packet 214 from station STA3 108. Once the data transfer between station STA3 108 and access point AP2 110 is complete, as indicated by an ACK message 216, station STA2 106 would sense the medium around it as idle because it is not within the transmission range of station STA1 104 and has not detected the exchange of RTS/CTS messages between station STA1 104 and access point AP1 102. Station STA2 106 may then start sending an RTS message 242 (or data) to access point AP1 102, which would collide with the ongoing transmission of the data packet 224 between station STA1 104 and access point AP1 102. Note that if the aggregation is used, then the data frame between station STA1 104 and access point AP1 102 could be large and several retransmission from station STA2 106 may be attempted in the frame duration. These collisions would cause errors in the decoding of the frame from station STA1 104 at access point AP1 102.

Note that the reason station STA2 106 attempted to transmit to access point AP1 102 was because it missed the CTS message 232 from access point AP1 102 and was out of range of station STA1 104. Consequently, station STA2 106 was decoding a packet that was not destined for it. Also note that reservation packets such as RTS and CTS are sent at a rate that can be decoded at low SNR, this problem has been called the blinded node problem, because station STA2 106 was "blinded" to other packets in the medium by trying to decode the data packet 214 from station STA3 108.

The illustration of two access points and three stations in the example described above is arbitrary. The same problem will arise in many other scenarios. For example, all five nodes in the networks can be STAs in an Independent Basic Service Set (IBSS), or equivalent sensor nodes in a wireless sensor networks or Mesh Points (MPs) and STAs and Mesh Access Points (MAPs) in an Extended Service Set Mesh Networks (ESS Mesh).

In order to resolve the blinded node problem, the nodes that are blinded by packets that are destined for other nodes should be able to stop decoding such packets and be able to receive and decode reservation packets that are in the medium. Two aspects may be taken in an attempt to solve the problem. The first involves implementation in the physical (PHY) layer, and the second involves the medium access control (MAC) layer.

Figure 3:
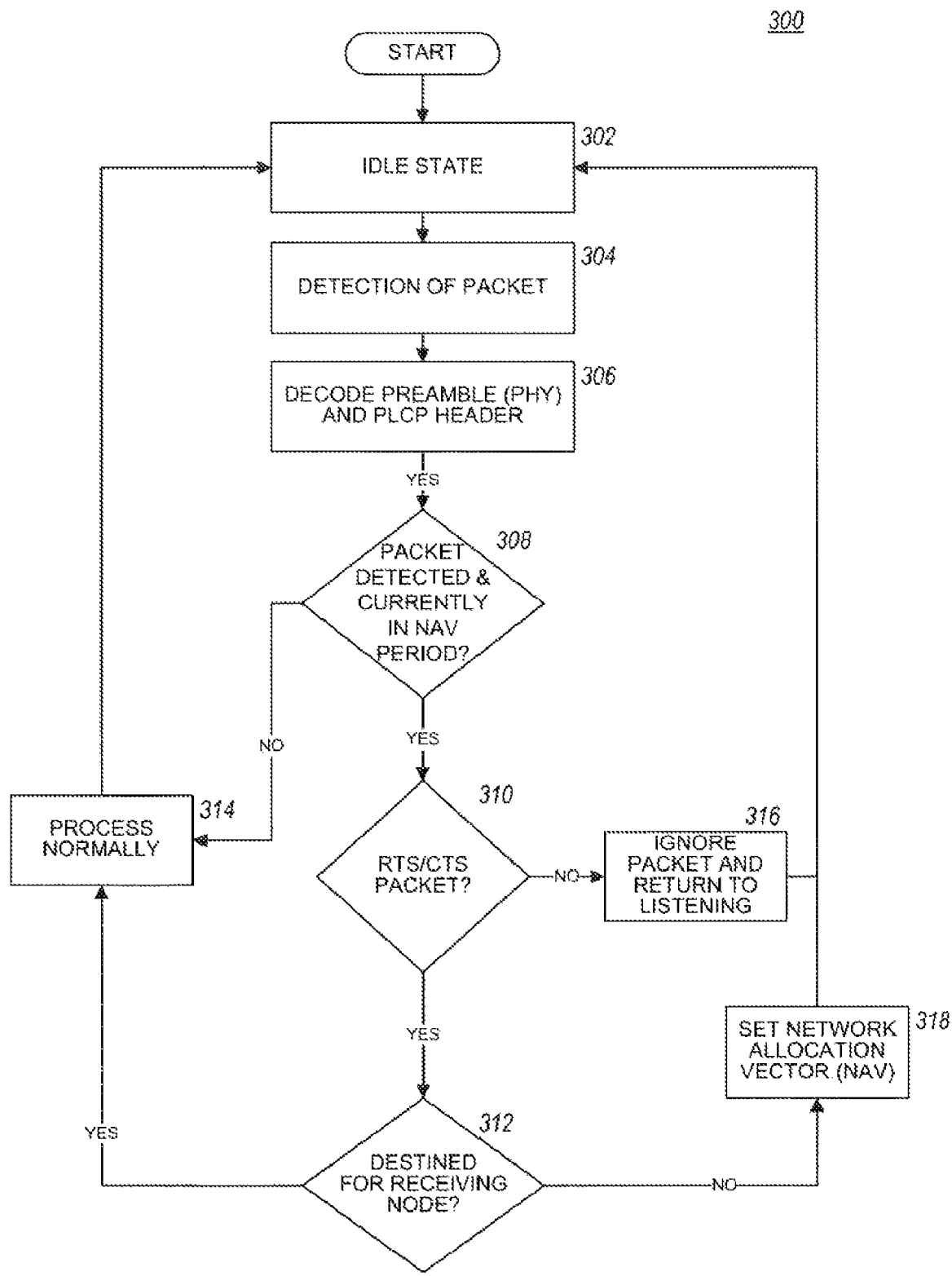
FIG. 3 is a flow diagram of a first aspect to addressing the blinded-node problem.

FIG. 3 illustrates a first process 300 for addressing the blinded node problem, implemented in the PHY layer of a node, which begins with step 302, in which the node enters into an idle state after it has been initialized. During the idle state, the node will attempt to detect a transmission of another node. Further, during the idle state, the node might have already set its NAV period according to a prior received packet. The operation of the first process 300 will be described with reference to FIG. 5 and to the network configuration illustrated in FIG. 1, where the "node" as referred to in the description is station STA2 106, except station STA2 106 now operates in accordance with the first process 300 for addressing the blinded node problem.

In step 304, the node has detected signals that may belong to a transmission of a packet and proceed to step 306, where the node will decode the preamble and the PLCP header. Then, in step 308, it is determined if the packet is detected during a NAV period. If the node is not in a NAV period, such as before time T0 in FIG. 5, then operation continues with step 314, where the packet is processed normally (e.g., the packet is decoded to determine the sender and recipient, and responds if, for example, the packet is destined for the node) and the node returns to its idle state in step 302. If the node is currently in the NAV period, such as a NAV period 552 at time T1 in FIG. 5, then operation continues with step 310.

In step 310, where the node is currently in a NAV period, the node will not transmit any requests. The node is only interested in messages such as RTS/CTS packets, which will extend the NAV period, such as at time T2 in FIG. 5, when a NAV period 554 is set that will extend the time that the node is in NAV period due to existing NAV period 552. Thus, in step 310 the node will determine if the packet contains an RTS/CTS packet such as, for example, an RTS message 512 or a CTS message 502—related to an exchange between station STA3 108 and access point AP2 110 to transmit a data packet 514; or an RTS message 522 or a CTS message 532—related to an exchange between station STA1 104 and access point AP1 102 to transmit a data packet 524. In one aspect, the node determines if the packet contains an RTS/CTS packet by examining the duration of the packet that is contained in the PLCP header because RTS/CTS packets have a fixed duration. Note that the time taken by RTS/CTS packets is fixed and can therefore be "hard-coded" into the PHY layer processing entity. If the duration field indicates that the frame may be an RTS/CTS packet, the node performs all operations needed to decode the packet. In another aspect, the node can determine if the packet contains an RTS/CTS packet by examining the MAC header, which will contain type information. If the message is not an RTS/CTS packet, then operation continues with step 316. Otherwise, if the message is an RTS/CTS packet, then operation continues with step 312. Further, ACK messages such as an ACK message 516 may be ignored by the node or may be processed to confirm that the NAV period that has been previously set, such as the NAV period 516, may be terminated.

In step 316, where the message has been determined by the node not to be an RTS/CTS packet, the node will ignore the packet. Specifically, if the node decodes a preamble and PLCP header, and the duration field indicates that the packet is not an RTS or CTS packet, such as at time T1 in FIG. 5 but a data packet such as the data packet 514, then the node determines that this corresponds to a data packet for the previous RTS or CTS (e.g., the RTS message 512 or the CTS message 502) and is therefore not addressed to the node. The node then stops accumulating any further bits for decoding the packet and returns to the mode for sensing the preamble of any other new packets. Operation will then return to step 302, where the node enters again into its idle state to listen for other preambles. It is noted that the although the node may not receive either an RTS or CTS packet because of low SINR, as long as it receives one or the other, it may act accordingly.

In step 312, where the packet has previously been determined to be an RTS/CTS packet, the node will determine the destination of the packet. If the packet is destined for the node, then operation proceeds with step 314, where the packet is processed normally. However, if the destination of the packet is not for the node, then operation will continue with step 318.

Figure 5:
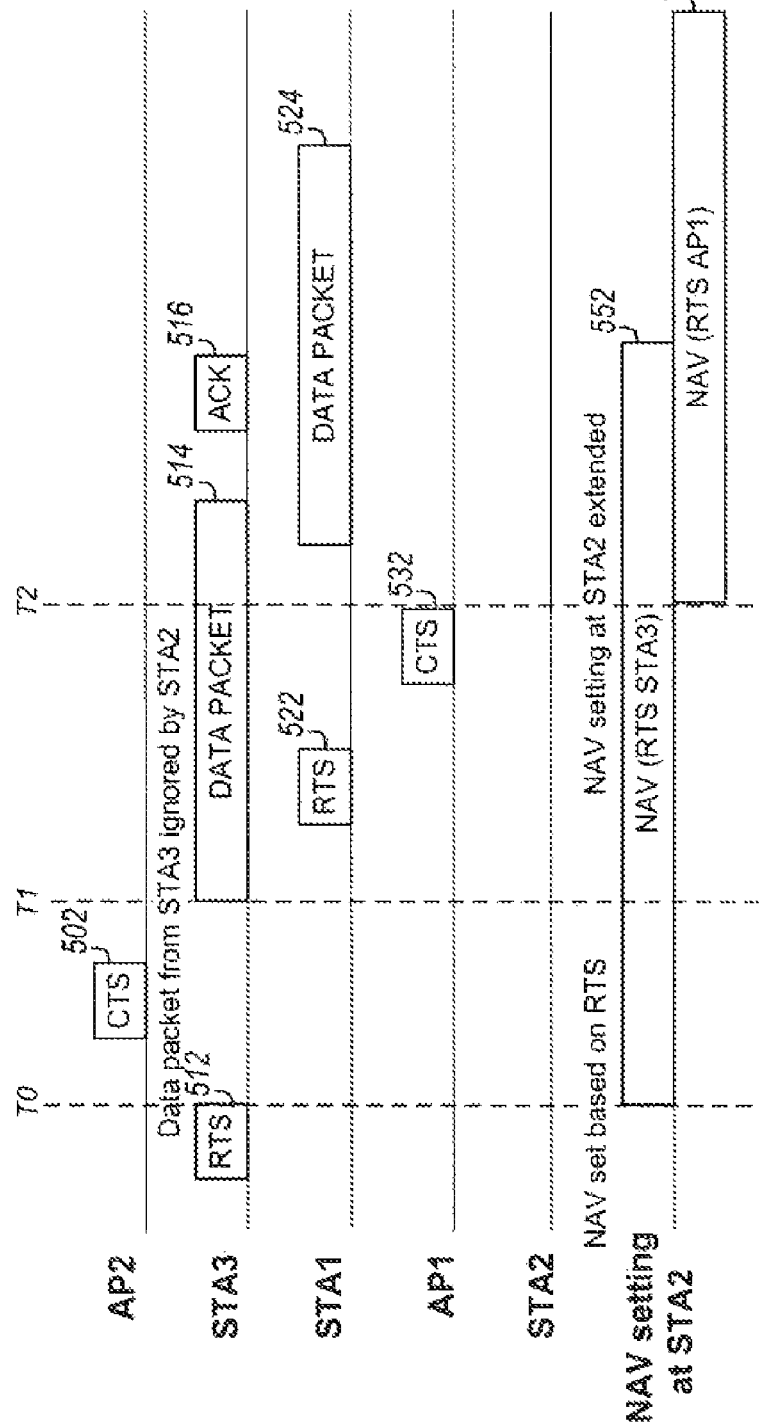
FIG. 5 is a timing diagram used to describe the aspects of FIGS. 3 and 4.

In step 318, when the node has determined that it decoded an RTS/CTS packet for data that is destined for a node other than the node, such as at times T1 or T2 in FIG. 5 (e.g., the RTS message 512/522 or the CTS message 502/532), the node will set or extend, respectively, its NAV period, such as extending the NAV period 552 by an additional amount based on the NAV period 554. Generally, based on the receive time of the RTS/CTS packet, the node can determine the time Tn at which the data frame will arrive and how long the packet transmission for the data will last.

In general, for the duration indicated by the NAV, the node proceeds in a manner according to the standard protocol, i.e., it checks each preamble, PLCP layer to determine whether the packet is of RTS/CTS duration. Packets that have durations different from RTS/CTS packets are not processed further and the node moves to detecting other preambles. For packets that are RTS/CTS packets, if these packets are successfully decoded by the node, then the NAV at the node may be extended according to the new RTS/CTS packets.

As can be seen in FIG. 5, the data packet 524 that is to be transmitted from station STA1 104 to access point AP1 102 will not be interrupted by a transmission from station STA2 106. Station STA2 106 will wait for an ACK message to be sent from access point AP1 102 (such as the ACK message 516 that was sent by station STA3 to confirm the receipt of the data packet 514 from station STA1 104), before attempting to transmit.

Figure 4:
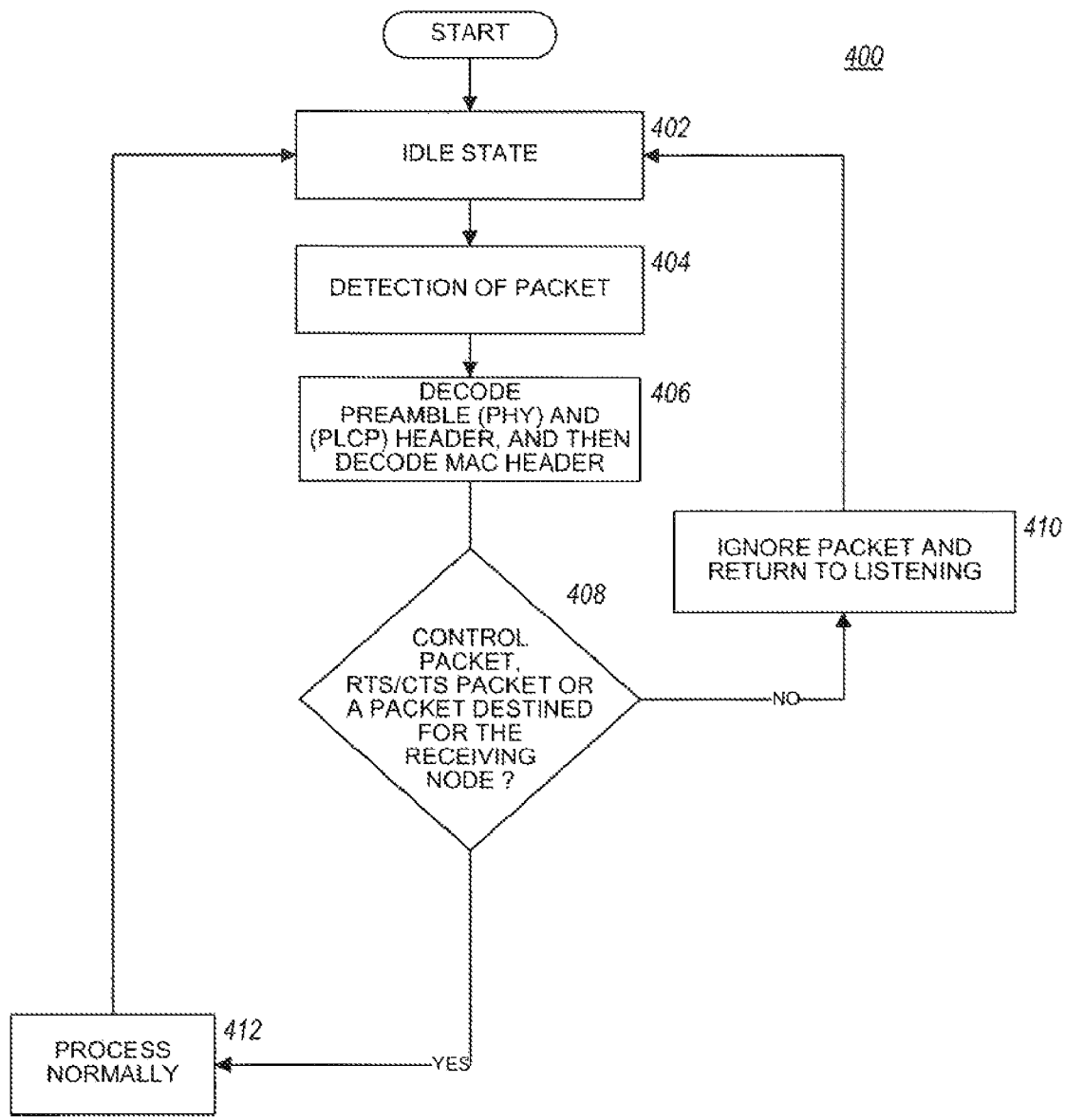
FIG. 4 is a flow diagram of a second aspect to addressing the blinded-node problem.

FIG. 4 illustrates a second process 400 for addressing the blinded node problem, implemented in the MAC layer of a node, which begins with step 402, in which the node enters into an idle state after it has been initialized. During the idle state, the node will attempt to detect a transmission of another node. The operation of the second process 400 will be described with reference to FIG. 5.

In step 404, the node has detected signals that may belong to a transmission of a packet and proceed to step 406, where the node will decode the preamble, the PLCP header, and then the MAC header.

Specifically, in step 406, when the node receives the preamble and PLCP of any packet, then the node proceeds to accumulate and decode sufficient bits corresponding to a MAC header. While performing the processing for the MAC header, the node will continue to accumulate the subsequent bits/symbols of the packet. However, the node proceeds to decode the header bits without waiting for the complete packet to be accumulated. The MAC header is used to determine, in step 408, if the destination address indicated corresponds to the node or if the packet is a broadcast packet or control packet such as an RTS/CTS packet.

In step 412, if the node is indeed the destination of the frame or if the packet is a broadcast, or an RTS/CTS or other control packet, then the complete frame is accumulated and decoded.

If the node is not the destination, then the packet decoding and accumulating functions at the node are terminated in step 410 and the node returns to the mode for sensing the preamble of any other new packets.

Either one or both of the above procedures may be implemented in an 802.11 devices. The PHY layer only aspect of FIG. 3 has the advantage that the packet decoding functions are not invoked for packets that are determined not to be RTS/CTS packets. Therefore, the node can save on power resources. However, the PHY layer only aspect is not useful in a network where the RTS/CTS method of medium reservation is sparingly used. In addition, the PHY layer-only aspect may cause packets destined for the node to be missed since a determination is made purely based on duration field. The MAC layer aspect of FIG. 4 is useful in all scenarios and may require the packet decoder to be invoked to process the packets.

Figure 6:
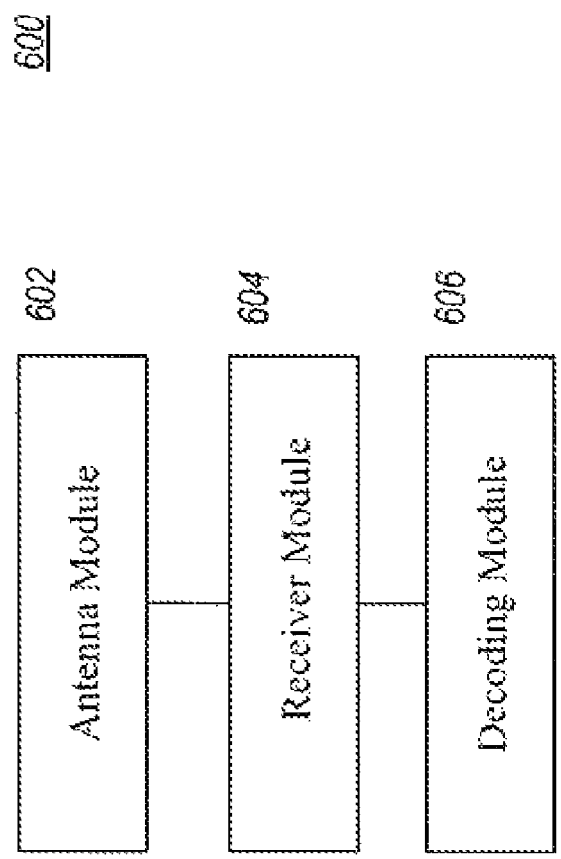
FIG. 6 is a block diagram of components of a node configured to implement the aspects of FIGS. 3 and 4.

FIG. 6 illustrates a configuration of a receiver portion 600 of a node configured to implement the PHY layer-only aspect of FIG. 3 and the MAC layer aspect of FIG. 4. As shown in the figure, the receiver portion 600 contains an antenna module 602 that is used to receive the radio signals carrying the various packets received by the node. The antenna module 602 may also be used to transmit radio signals as well. Coupled to the antenna module 602 is a receiver module 604. The receiver module 604 is configured to receive the packets transmitted over the radio signals received by the antenna module 602. A decoder module 606 is coupled to the receiver module 604. The decoder module 606 is configured to decode the header and other parts of the packet received by the receiver module 604.

Figure 7:
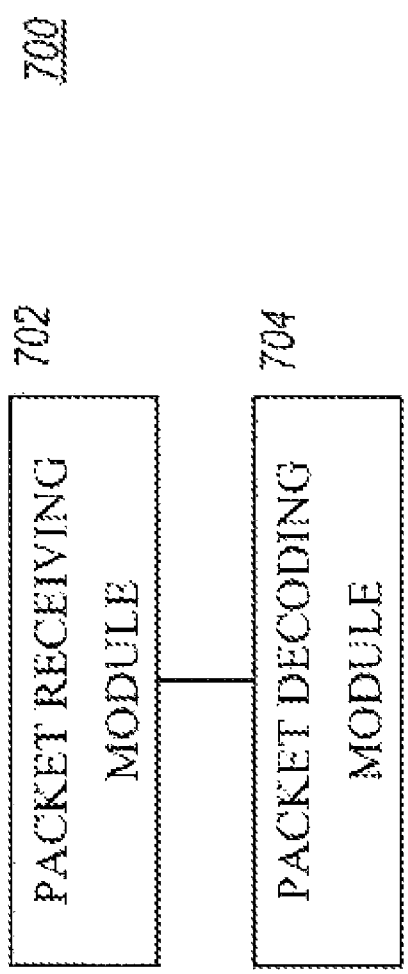
FIG. 7 is a second block diagram of components of a node configured to implement the aspects of FIGS. 3 and 4.

FIG. 7 illustrates a second configuration of a receiver portion 700 of a node configured to implement the PHY layer-only aspect of FIG. 3 and the MAC layer aspect of FIG. 4. The receiver portion 700 includes a module 702 for receiving a packet including at least one header and non-header information, and a module 704 for decoding the at least one header to determine whether the non-header information should be processed.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The teachings herein may be incorporated into (e.g., implemented within or performed by) a variety of apparatuses (e.g., devices). For example, each node may be configured, or referred to in the art, as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Certain nodes also may be referred to as subscriber stations. A subscriber station also may be known as a subscriber unit, a mobile station, a remote station, a remote terminal, an access terminal, a user terminal, a user agent, a user device, or user equipment. In some implementations a subscriber station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the present disclosure. Thus, the present disclosure is not intended to be limited to the aspects shown herein but is to be accorded the widest scope consistent with the principles and novel features disclosed herein.

What is claimed is:

1. A method of wireless communication comprising:
   receiving a packet comprising at least one header and non-header information at a receiving node;
   decoding the at least one header;
   determining a type of the packet from the decoded header;
   processing the non-header information upon determining that the type is a control packet;
   determining a destination of the packet from the decoded header upon determining that the type is a data packet; and
   before a time duration of the packet ends, returning to monitoring for a transmission of another packet upon determining that the destination is for a node different from the receiving node;

wherein receiving the packet comprises accumulating bits corresponding to the non-header information while decoding the at least one header.

2. The method of claim 1, wherein processing the non-header information upon determining that the type is a control packet further comprises setting a network allocation vector (NAV), during which the receiving node avoids transmission of a request to send (RTS).

3. The method of claim 1, wherein receiving the packet comprises accumulating bits corresponding to the non-header information while determining the destination, and wherein the method further comprises stopping further accumulation of bits corresponding to the non-header information upon determining that the destination is for a node different from the receiving node.

4. The method of claim 1, wherein the control packet is one of a request to send (RTS) packet and a clear to send (CTS) packet.

5. The method of claim 1, wherein decoding the at least one header comprises decoding the at least one header at a media access control (MAC) layer.

6. A computer-program product for wireless communication comprising:
 computer-readable storage medium comprising codes executable by at least one computer to:
  receive a packet comprising at least one header and non-header information at a receiving node;
  decode the at least one header;
  determine a type of the packet from the decoded header;
  process the non-header information upon determining that the type is a control packet;
  determine a destination of the packet from the decoded header upon determining that the type is a data packet; and
  before a time duration of the packet ends, return to monitoring for a transmission of another packet upon determining that the destination is for a node different from the receiving node;
  wherein the code to receive the packet comprises code to accumulate bits corresponding to the non-header information while the at least one header is being decoded.

7. An apparatus for wireless communications comprising:
 means for receiving a packet comprising at least one header and non-header information;
 means for decoding the at least one header;
 means for determining a type of the packet from the decoded header;
 means for processing the non-header information upon determining that the type is a control packet;
 means for determining a destination of the packet from the decoded header upon determining that the type is a data packet; and
 means for, before a time duration of the packet ends, returning to monitoring for a transmission of another packet upon determining that the destination is for a node different from the apparatus;
 wherein the means for receiving comprises means for accumulating bits corresponding to the non-header information while the means for decoding is decoding the least one header.

8. The wireless communications apparatus of claim 7, wherein the means for processing the non-header information upon determining that the type is a control packet comprises means for setting a network allocation vector (NAV), during which the apparatus avoids transmission of a request to send (RTS).

9. The wireless communications apparatus of claim 7, wherein the means for receiving the packet comprises means for accumulating bits corresponding to the non-header information while the means for determining the destination is determining the destination, the apparatus further comprising means for stopping further accumulation of bits corresponding to the non-header information upon determining that the destination is for a node different from the apparatus.

10. The wireless communications apparatus of claim 7 wherein the control packet is one of a request to send (RTS) packet and a clear to send (CTS) packet.

11. An apparatus for wireless communications comprising:
 a receiver configured to receive a packet comprising at least one header and non-header information; and
 a decoder configured to decode the at least one header, to determine a type of the packet from the decoded header, to process the non-header information upon determining that the type is a control packet, to determine a destination of the packet from the decoded header upon determining that the type is a data packet, and before a time duration of the packet ends, to return to monitoring for a transmission of another packet upon determining that the destination is for a node different from the apparatus;
 wherein the receiver is configured to accumulate bits corresponding to the non-header information while the decoder is decoding the at least one header.

12. The apparatus of claim 11, wherein, upon determining that the type is a control type, the decoder is configured to set a network allocation vector (NAV), during which the apparatus avoids transmission of a request to send (RTS).

13. The apparatus of claim 11, wherein the receiver is configured to accumulate bits corresponding to the non-header information while the decoder is determining the destination, and wherein the receiver is further configured to stop further accumulation of bits corresponding to the non-header information upon the decoder determining that the destination is for a node different from the apparatus.

14. The apparatus of claim 11, wherein the control packet is one of a request to send (RTS) packet and a clear to send (CTS) packet.

15. The apparatus of claim 11, wherein the decoder is configured to decode the at least one header at a media access control (MAC) layer.

16. An access point comprising:
 an antenna;
 a receiver adapted to receive, via the antenna, a packet comprising at least one header and non-header information; and
 a decoder configured to decode the at least one header, to determine a type of the packet from the decoded header, to process the non-header information upon determining that the type is a control packet, to determine a destination of the packet from the decoded header upon determining that the type is a data packet, and before a time duration of the packet ends, to return to monitoring for a transmission of another packet upon determining that the destination is for a node different from the access point;
 wherein the receiver is configured to accumulate bits corresponding to the non-header information while the decoder is decoding the at least one header.

17. An access terminal comprising:
 a receiver adapted to receive a packet comprising at least one header and non-header information;
 a decoder configured to decode the at least one header, to determine a type of the packet from the decoded header, to process the non-header information upon determining that the type is a control packet, to determine a destination of the packet from the decoded header upon determining that the type is a data packet, and before a time duration of the packet ends, to return to monitoring for a transmission of another packet upon determining that the destination is for a node different from the access terminal; and a user interface adapted to provide an indication based on the non-header information;

wherein the receiver is configured to accumulate bits corresponding to the non-header information while the decoder is decoding the at least one header.

18. A method of wireless communication comprising:
receiving a packet comprising at least one header and non-header information at a receiving node;
determining whether a network allocation vector (NAV) is set; and
upon determining the NAV is set, then performing the steps of:
   determining a type of the packet, wherein determining the type of the packet comprises:
      determining a duration of the packet from the header information; and
      determining whether the packet is a control packet based on the duration of the packet;
   upon determining that the type is a control packet, then processing the non-header information; and
   upon determining that the type is a data packet, then stopping further processing of the non-header information.

19. The method of claim 18, wherein the control packet is one of a request to send (RTS) packet and a clear to send (CTS) packet.

20. The method of claim 18, wherein upon determining the type is a control packet, then performing:
   determining a destination of the control packet; and
   extending a period of the NAV upon determining that the destination is for a node different from the receiving node.

21. A computer-program product for wireless communication comprising:
   computer-readable storage medium comprising codes executable by at least one computer to:
   receive a packet comprising at least one header and non-header information at a receiving node;
   determine whether a network allocation vector (NAV) is set; and
   upon determining the NAV is set, then to:
      determine a type of the packet, wherein determining the type of the packet comprises:
         determining a duration of the packet from the header information; and
         determining whether the packet is a control packet based on the duration of the packet;
      process the non-header information upon determining that the type is a control packet; and
      stop further processing of the non-header information upon determining that the type is a data packet.

22. An apparatus for wireless communications comprising:
means for receiving a packet comprising at least one header and non-header information;
means for determining whether a network allocation vector (NAV) is set;
   means for determining a type of the packet, upon determining the NAV is set, wherein the means for determining the type of the packet comprises:
      means for determining a duration of the packet from the header information; and
      means determining whether the packet is a control packet based on the duration of the packet;
   means for processing the non-header information upon determining that the type is a control packet; and
   means for stopping further processing of the non-header information upon determining that the type is a data packet.

23. An apparatus for wireless communications comprising:
a receiver configured to receive a packet comprising at least one header and non-header information; and
a decoder configured to determine whether a network allocation vector (NAV) is set, and upon determining the NAV is set, to determine a type of the packet by determining a duration of the packet from the header information and determining whether the packet is a control packet based on the duration of the packet, to process the non-header information upon determining that the type is a control packet, and to stop further processing of the non-header information upon determining that the type is a data packet.

24. An access point comprising:
an antenna;
a receiver adapted to receive, via the antenna, a packet comprising at least one header and non-header information; and
a decoder configured to determine whether a network allocation vector (NAV) is set, and upon determining the NAV is set, to determine a type of the packet by determining a duration of the packet from the header information and determining whether the packet is a control packet based on the duration of the packet, to process the non-header information upon determining that the type is a control packet, and to stop further processing of the non-header information upon determining that the type is a data packet.

25. An access terminal comprising:
a receiver adapted to receive a packet comprising at least one header and non-header information;
a decoder configured to determine whether a network allocation vector (NAV) is set, and upon determining the NAV is set, to determine a type of the packet by determining a duration of the packet from the header information and determining whether the packet is a control packet based on the duration of the packet, to process the non-header information upon determining that the type is a control packet, and to stop further processing of the non-header information upon determining that the type is a data packet; and
a user interface adapted to provide an indication based on the non-header information.

* * * * *